Feb. 13, 1968   J. H. COWLES ET AL   3,368,855
BEARING RETAINER
Filed Oct. 24, 1965
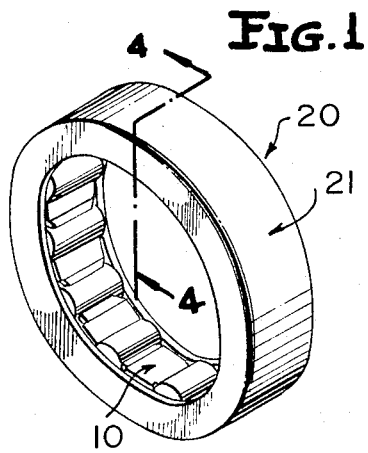
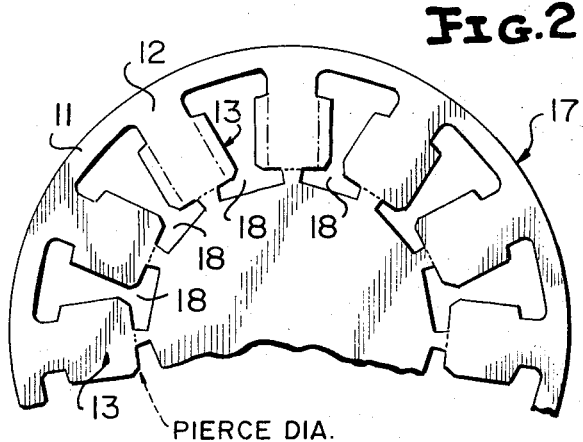
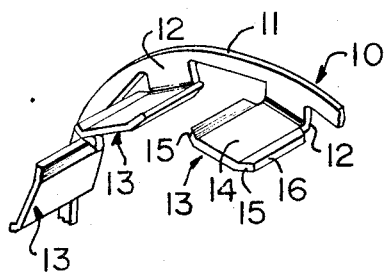
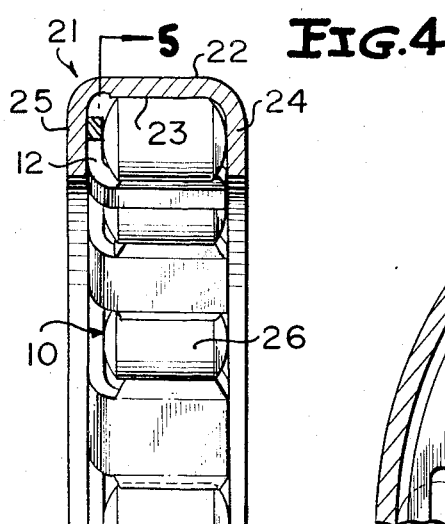
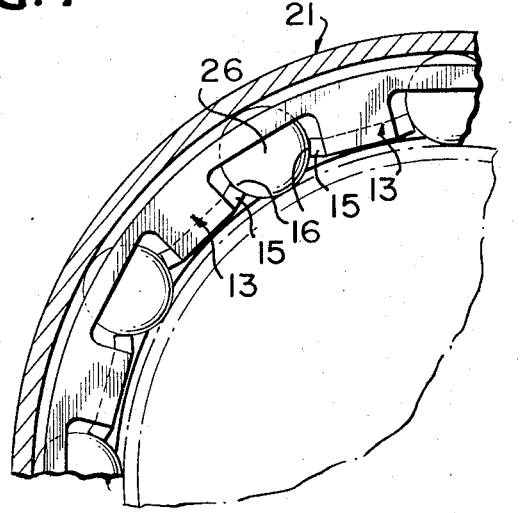
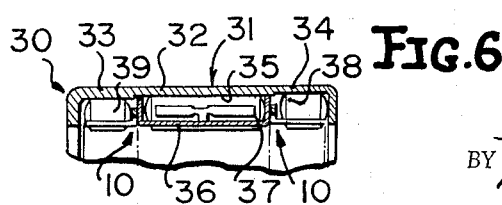
INVENTORS
JOHN H. COWLES &
ROBERT H. WHITE
BY Mason, Porter, Diller & Brown
ATTORNEYS nited States Patent Office 3,368,855
Patented Feb. 13, 1968

3,368,855
BEARING RETAINER
John H. Cowles, Forestville, and Robert H. White, Torrington, Conn., assignors to The Torrington Company, Torrington, Conn., a corporation of Maine
Filed Oct. 24, 1965, Ser. No. 504,832
8 Claims. (Cl. 308—217)

ABSTRACT OF THE DISCLOSURE

This disclosure relates to a retainer for rollers and includes an annular rim having projecting therefrom a plurality of axially extending retaining elements lying in a cylindrical pattern and being equally circumferentially spaced. The retaining elements are connected to the annular rim by radial tabs and are of a generally U-shaped cross section. Each retaining element includes a central portion and radially sloping edge portions with the edge portions terminating in roller retaining faces and the spacing between the edge portions being slightly less than the diameter of the roller whereby a roller may be snapped between adjacent edge portions.

This invention relates in general to new and useful improvements in bearing constructions, and more particularly to a novel retainer to be utilized with a bearing of the roller type.

A primary object of this invention is to provide a novel sheet metal retainer which is of an extremely simple construction and which may be punched from a circular blank and shaped in a minimum of operations.

Another object of this invention is to provide a novel sheet metal retainer which includes an annular rim having a plurality of radially projecting tabs, and each of the tabs supporting an axially extending retaining element, the retaining elements having sloping edge portions presenting faces spaced apart a distance less than the diameter of a roller to be utilized with the retainer and serving as guidance surfaces for the rollers in the function of a complete bearing.

Another object of this invention is to provide a novel retainer for use as part of a roller bearing wherein the retainer is formed of sheet metal and includes a plurality of axially extending retaining elements, each of the retaining elements being of a generally U-shaped configuration and including sloping edge portions having free edge faces adapted for retaining engagement with rollers, and the retaining elements being resilient so as to permit the snapping of rollers thereinbetween.

A still further object of this invention is to provide a novel retainer for roller bearings which is formed of sheet metal and which may be formed from a circular sheet metal blank by first punching the blank and then performing a simple bending operation thereon, the elements of the retainer lying in two principal planes.

A still further object of this invention is to provide a novel sheet metal retainer for rollers of a roller bearing, the retainer being of an extremely simple construction and readily formable with a minimum of forming operations so as to be economically feasible.

With the above and other objects in view that will hereinafter appear, the nature of the invention will be more clearly understood by reference to the following detailed description, the appended claims and the several views illustrated in the accompanying drawing.

In the drawing:

FIGURE 1 is a perspective view of a roller bearing incorporating the retainer.

FIGURE 2 is a fragmentary plan view of a partially formed blank from which the retainer is formed.

FIGURE 3 is a fragmentary perspective view of a portion of the retainer and shows the specific details of construction thereof.

FIGURE 4 is an enlarged fragmentary sectional view taken along the line 4—4 of FIGURE 1.

FIGURE 5 is an enlarged fragmentary sectional view taken along the line 5—5 of FIGURE 4.

FIGURE 6 is a fragmentary sectional view taken through an overrunning clutch showing an additional use for the retainer.

Referring now to the drawing in detail, it will be seen that there is illustrated in FIGURES 3, 4 and 5 the retainer which is the subject of this invention, the retainer being generally referred to by the numeral 10. The retainer 10 is formed of a single piece of sheet metal and includes an annular rim 11 having a plurality of radially inwardly projecting connecting tabs 12 integrally formed thereon. Each of the connecting tabs 12 is of an L-shape configuration, as is best shown in FIGURE 4, and has integrally connected thereto a retaining element 13. Each retaining element 13 is of a generally U-shaped cross section and includes a central portion 14 and a pair of side edge portions 15. The central portion 14 is of substantially the same width as the connecting tab 12 and the side edge portions 15 slope radially outwardly and terminate in roller engageable faces 16.

Referring now to FIGURE 2 in particular, it will be seen that the retainer 10 may be formed from a circular blank which is generally referred to by the numeral 17. The blank 17 is formed of flat sheet metal and after it has been made circular in over-all outline, a plurality of generally I-shaped openings 18 are formed in the blank 17 at equal circumferential spacing. It will be noted that the formation of the openings or cut-outs 18 in a single operation defines the rim 11, the connecting tabs 12 and the retaining elements 13. After the openings or cut-outs 18 have been formed, the central portion of the blank 17 is removed by a simple piercing operation. Either prior to the piercing operation or subsequent thereto, the edge portions of the retaining elements 13 are folded to define the sloping edge portions 15. Then a suitable forming member is passed through the partially formed retainer while the rim 11 is clamped so as to bend the connecting tabs 12 to assume the L-shape configuration thereof. The shaping of the retainer 10 is then completed and it is suitably hardened in a subsequent heat treating operation.

The retainer 10 may be utilized in a simple roller bearing construction such as that illustrated in FIGURE 1 and generally referred to by the numeral 20. The roller bearing 20, in addition to the retainer 10, includes an outer race forming member in the form of a shell 21. The shell 21 may be of any construction, but is preferably formed of sheet metal and includes a cylindrical body portion 22 of which the inner surface defines a race surface 23. The shell 21 also includes a pair of lips or flanges 24 and 25. The preferred method of making the shell 21 is by forming a cup and then piercing the bottom of the cup to define the lip or flange 24. Then, after the retainer 10 has been positioned within the shell 21, the flange 25 is turned over.

The bearing 20 may be assembled in numerous manners. For example, the shell 21 may be hardened before the flange 25 is turned over and an assembly including the retainer 10 and a plurality of rollers 26 may be positioned within the shell 21 after which the flange 25 is folded over. On the other hand, the retainer 10 may be assembled with the shell 21 and thereafter the rollers 26 snapped in between the adjacent edge portions 15 of adjacent retaining elements 13. Also, if desired, the retainer 10 and the shell 21 may be assembled as a unit prior to the heat treatment thereof for the purpose of hardening the surfaces thereof.

It is to be understood that the retaining elements 13 will retain the rollers 26 within the shell 21 at all times. As is clearly apparent from FIGURE 5, the spacing between the opposed faces 16 of adjacent retaining elements 13 is less than the diameter of the roller 26. It is to be noted at this time also that each two adjacent retaining element edge portions 15 lie in planes which intersect substantially at the center of rotation of a roller 26 positioned therebetween.

It is preferred, although not necessary, that the retaining elements 13 be sufficiently resilient so as to be radially deflectable to permit the snapping of the rollers 26 therethrough. It is to be understood that when this condition exists, the retaining elements themselves will flex a certain amount and the connecting tabs 12 will also flex. Because the retainer 10 is formed of hardened sheet metal, the deflected portions thereof will immediately snap back to their original positions after the roller has passed therebetween.

Referring now to FIGURE 6, it will be seen that the retainer 10 may be utilized in conjunction with an overrunning clutch. The overrunning clutch illustrated in FIGURE 6 is generally referred to by the numeral 30 and includes a shell 31 having a body portion 32 with an inner surface thereof configurated to define a first race surface 33 and a second race surface 34 which are disposed in axially spaced relation. The inner surface of the body portion 32 intermediate the race surfaces 33 and 34 is configurated to define an outer clutch member surface 35.

A clutch retainer 36, which is not the subject of this invention, is positioned generally in alignment with the outer clutch member surface 35 and retains in position a plurality of clutch rollers 37.

A retainer 10 is disposed in alignment with each of the race surfaces 33 and 34. It is to be noted that the two retainers are of left and right configurations. It is also to be noted that the two retainers are of slightly different sizes in that bearing rollers 38 associated with the retainer in alignment with the race surface 34 are of a larger diameter than the bearing rollers 39 engaged with the retainer associated with the race surface 33.

Although only a preferred embodiment of the invention has been specifically illustrated and described herein, it is to be understood that minor variations may be made in the disclosed retainer without departing from the spirit and scope of the invention, as defined by the appended claims.

We claim:

1. A retainer for rollers comprising a plurality of axially extending retaining elements lying in a cylindrical pattern and being equally circumferentially spaced, and connecting means interconnecting all of said retaining elements, each of said retaining elements being generally U-shaped in cross section and including a central portion and radially sloping edge portions terminating in face means for retaining rollers, said face means being disposed remote from and facing away from said central portion.

2. The retainer of claim 1 wherein said connecting means includes an annular rim having a plurality of radial tabs extending therefrom, each of said tabs terminating in one of said retaining elements, said tabs and said retaining element central portions being of like width.

3. A retainer for rollers of a predetermined diameter comprising a plurality of axially extending retaining elements lying in a cylindrical pattern and being equally circumferentially spaced, and connecting means interconnecting all of said retaining elements, each of said retaining elements being generally U-shaped in cross section and including a central portion and radially sloping edge portions, said edge portions terminating in roller retaining faces, adjacent retaining element edge portions defining and lying in planes intersecting substantially at a roller center of rotation.

4. A retainer for rollers of a predetermined diameter comprising a plurality of axially extending retaining elements lying in a cylindrical pattern and being equally circumferentially spaced, and connecting means interconnecting all of said retaining elements, each of said retaining elements being generally U-shaped in cross section and including a central portion and radially sloping edge portions, said edge portions terminating in roller retaining faces, said retainer being a part of a roller bearing including an outer race forming member and a plurality of rollers, said edge portions opposing said outer race forming members and limiting radially inwardly displacement of said rollers, said connecting means including an annular rim having a plurality of radial tabs extending therefrom, each of said tabs terminating in one of said retaining elements, said rim lying in a radial plane axially offset from said retaining elements, said rim opposing first ends of said rollers, and said retaining elements being resiliently deflectable to permit said rollers to be snapped in between said retainer and said race forming member after said retainer has been assembled with said race forming member.

5. A roller and retainer assembly comprising a plurality of rollers of a predetermined diameter and a retainer cooperating with said rollers to retain said rollers in spaced relation along a predetermined pitch circle, said retainer including an annular rim disposed at one end of said rollers and extending in a radial direction to opposite sides of said pitch circle, and a plurality of axially extending retaining elements carried by said rim and disposed on one side of said pitch circle, said retaining elements being generally U-shaped in section and opening towards said pitch circle, and the spacing between adjacent ones of said retaining elements being less than the diameter of said rollers.

6. The roller and retainer assembly of claim 5 wherein each retaining element includes a central portion and generally planar edge portions, said edge portions terminating in roller engaging faces, and edge portions lying on opposite sides of a roller lying in planes intersecting substantially at the center of rotation of that roller.

7. A retainer comprising an annular rim having first and second edges, and a plurality of axially extending retaining elements lying in a cylindrical pattern and being equally circumferentially spaced, said retaining elements being connected to said rim along said second edge and being generally U-shaped in section and opening generally towards said rim first edge, the radial spacing of a remote surface of each retaining element from said rim first edge being at least twice the radial extent of each retaining element.

8. The retainer of claim 7 wherein said annular rim includes a separate radially extending connecting tab connected to each retaining element.

References Cited

UNITED STATES PATENTS

| | | | |
|---|---|---|---|
| 1,125,452 | 1/1915 | Bower | 308—217 |
| 1,765,648 | 6/1930 | Bott | 308—217 |
| 2,122,365 | 6/1938 | Beck | 308—217 |

FOREIGN PATENTS 676,922  12/1929  France.

MARTIN P. SCHWADRON, *Primary Examiner.*

FRANK SUSKO, *Examiner.*